2,755,076
GASEOUS FUEL MIXER

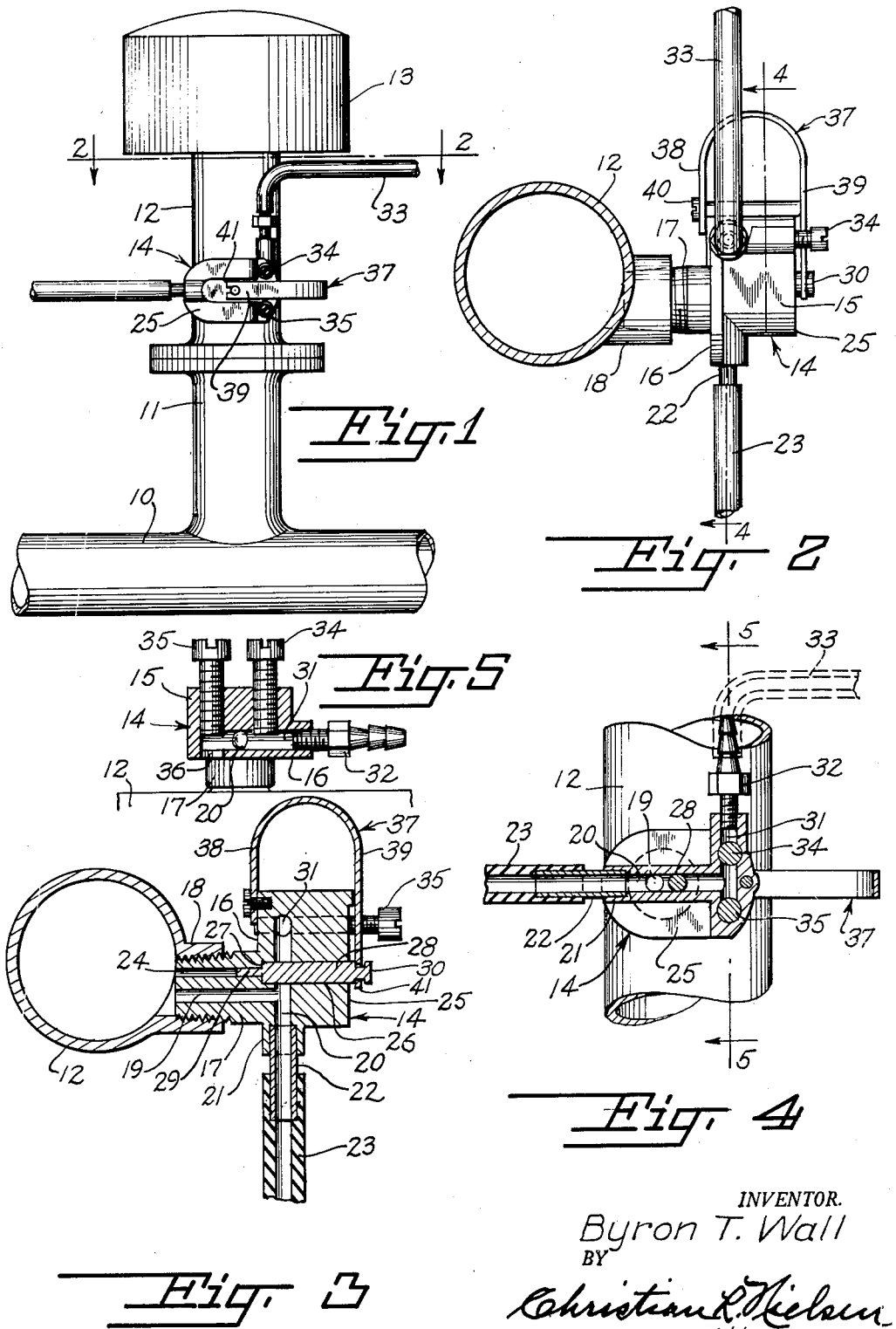
July 17, 1956 — B. T. WALL — 2,755,076
GASEOUS FUEL MIXER
Filed Dec. 12, 1952
INVENTOR.
Byron T. Wall
BY
Christian R. Nielsen
Attorney

Byron T. Wall, Flushing, N. Y.

Application December 12, 1952, Serial No. 325,539

1 Claim. (Cl. 261—39)

This invention relates to a gaseous fuel mixer for use with internal combustion engines and it consists in the constructions, arrangements and combinations herein described and claimed.

It is known that a lean explosive mixture, such as would be suitable for operation of an internal combustion engine under normal operating temperature, provides difficulties in starting the engine particularly during cold weather, necessitating choking off the air to the intake of the carburetor to provide a richer explosive mixture.

The present invention comprises a mixing device which is installed between the intake manifold of an engine and the carburetor which automatically regulates the flow of air and an oil-emulsified water into the intake manifold when the engine is warm and automatically cuts off the air and water supply when the engine is cold so that a richer gaseous mixture is supplied to the engine at the time required.

It is the cardinal object of the invention to provide a gaseous fuel mixer in which an auxiliary air supply and an oil-emulsified water supply to the intake manifold of an engine is automatically controlled by means of a valve device actuated by means of heat and vacuum created by the engine.

A further object of the invention is to provide a valve for controlling passage of air and water into the intake manifold of an engine by the use of a bi-metallic element having thermostatic properties, actuated by heat from the operation of the engine, there being means connected with the bi-metallic element and operable by vacuum created in the intake manifold for moving the valve to closed position during idling period of the engine to thereby prevent a weak or lean mixture of gaseous fuel at idling speeds.

Additional objects, advantages and features of invention will be apparent from the following description, considered in connection with the accompanying drawing, wherein:

Figure 1 is a fragmentary elevation of an engine intake manifold and carburetor having the fuel mixer installed thereon.

Figure 2 is a cross section on the line 2—2 of Figure 1,

Figure 3 is a similar view to that shown in Figure 2, but showing the valve in section.

Figure 4 is a cross section on the line 4—4 of Figure 2, and

Figure 5 is a cross section on the line 5—5 of Figure 4.

Attention is first invited to Figure 1 of the drawing, wherein a conventional intake manifold 10 of an engine is shown having a flanged pipe 11 for coupling onto a flanged pipe 12 of a carburetor 13, the fuel mixer 14 being suitably mounted in the pipe 12.

The fuel mixer 14 is molded as an integral body 15 having a substantially planiform face 16 upon one side thereof and from which an exteriorly threaded nipple 17 projects adapted to be threadedly engaged in an interiorly threaded boss 18 of the pipe 12. The boss 18 is customarily employed in certain makes of motor vehicle engines to establish a connection for a suction line to the wind shield wiper of the vehicle, and is so employed in this installation, as will be explained.

The nipple 17 has a bore 19 which is in open communication between the pipe 12 and a bore 20 provided in the body 15, the latter being at right angles to the first bore, as clearly shown in Figure 3. The bore 20 opens into a boss 21, the latter receiving a pipe 22 forming a connecting means for a flexible hose 23, this leading to the suction side of a windshield wiper (not shown).

The nipple 17 is further provided with a bore 24 extending parallel to the bore 19 and of lesser diameter. Concentric with the bore 24 and extending from the exterior wall 25 of the body, a bore 26 is formed of a diameter greater than the bore 24, the bore terminating beyond the bore 20 forming a seat 27. A piston valve 28 is reciprocably mounted in the bore 26 having a reduced end for seating engagement in the bore 24, and in the closed position of the valve the shoulder formed by the reduced end 29 will engage the seat 27. The outer end of the piston valve 28 is formed with an annular kerf forming a head 30 for a purpose to be explained.

As clearly shown in Figure 4, the port 20 is in communication with a port 31 extending at right angles thereto, one side of said port being connected to a fitting 32 establishing connection with a flexible hose 33 associated with a source oil-emulsified water (not shown). A screw 34 is threadedly engaged in the body positioned so as to intersect the bore 31 in advance of the fitting 32 in order to regulate the flow of liquid into the bore, and a similar screw 35 is mounted in the body so as to intercept the bore 31 so as to regulate the amount of air which may be admitted through a port 36 which is open to the atmosphere (see Figure 5).

A bi-metallic member 37 of U-shaped formation is employed for actuating the valve 28. The bi-metallic member comprises spaced legs 38 and 39, the leg 38 being secured upon the face 16 of the mixer body by means of a screw 40. The leg 39 is formed with a slot 41 in its free end adapted to seat in the kerf formed by the head 30 of the piston valve. Thus, when the bi-metallic member 37 is influenced through temperature changes of the motor, the piston 28 will be caused to reciprocate in such manner as to control the passage of oil-emulsified water and air into the intake manifold 10 of the engine.

The operation of the mixer is as follows, the device being installed as shown in Figure 1, it being assumed that the motor is cold, the valve 28 being in closed position as best seen in Figure 3, preventing entrance of water and air to the intake manifold, and thus a rich mixture will be supplied to the motor upon starting thereof. As the engine warms up, the bi-metallic member 37 will expand so as to move the leg 39 away from the mixer 14 with consequent outward movement of the piston valve 28 so that oil-emulsified water may be drawn into the pipe 12 due to suction created by the motor, by virtue of the bores 31 and 24. Air will be simultaneously drawn into the bores 31 and 24 through the port 36 and mixed with the oil emulsified water. This mixture is thoroughly agitated in the ports and passes on and discharges into the combustion chamber of the motor together with gaseous fuel from the carburetor. The motor being hot, the water content of the mixture readily forms steam increasing the efficiency of the motor since the octane value of the gasoline is greatly increased.

It will be understood, of course, that the proportion of water and air may be regulated by adjustment of the screws 34 and 35.

The ports 19 and 20 are in open communication with the hose 23 at all times, and therefore operation of a wind shield wiper connected with the hose, will not be affected, regardless of the position of the piston valve 28. In such cases where a wiper connection is not required, the port 20 may be closed by a suitable plug.

While I have shown and described a preferred form of the device, this is by way of illustration only and I consider as my own all such modifications in construction as fairly fall within the scope of the appended claim.

I claim:

A gaseous fuel mixer comprising a body member having a nipple for threadedly engaging an opening in the gaseous intake manifold of a motor, said nipple having a first bore, a second bore formed in said body member at right angles to the first bore of said nipple, said second bore having means for connection with a supply of water and also having a port for admission of air, a third bore formed in said nipple parallel to the first bore, valve means for controlling entrance of water and air into said third bore comprising a reciprocable piston valve having seating engagement in the third bore of the nipple, extending across and sealing passage of water and air through the second bore, said reciprocable piston valve having an end projecting exteriorly of said body member, a U-shaped thermostatic member having a pair of parallel spaced legs, one of said legs being rigidly secured to said body member, the other of said legs being freely movable under temperature variations of the intake manifold of the motor, the free end of said leg having operative connection with the projecting end of said reciprocable piston valve and said first named bore being positioned at a point not affected by the open or closed positions of the reciprocable piston valve, and hose means for connecting the second named bore of the body member to the suction side of a windshield wiper.

References Cited in the file of this patent
UNITED STATES PATENTS

| | | |
|---|---|---|
| 1,206,625 | Vetter | Nov. 28, 1916 |
| 1,235,806 | Jensen | Aug. 7, 1917 |
| 2,598,445 | Schneider | May 27, 1952 |